(12) United States Patent
Meyer et al.

(10) Patent No.: US 10,915,103 B2
(45) Date of Patent: Feb. 9, 2021

(54) METHOD FOR TRAFFIC LANE RECOGNITION

(71) Applicant: FORD GLOBAL TECHNOLOGIES, LLC, Dearborn, MI (US)

(72) Inventors: Andreas Meyer, Kuerten (DE); Guido Weitkus, Cologne (DE); Patrick Glet, Cologne (DE); Benjamin Maus, Dusseldorf (DE); Manuel Merz, Montabaur (DE)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 16/128,675

(22) Filed: Sep. 12, 2018

(65) Prior Publication Data
US 2019/0079520 A1 Mar. 14, 2019

(30) Foreign Application Priority Data
Sep. 12, 2017 (DE) .......................... 10 2017 216 063

(51) Int. Cl.
| | |
|---|---|
| G05D 1/00 | (2006.01) |
| G06K 9/00 | (2006.01) |
| B60W 30/12 | (2020.01) |
| G05D 1/02 | (2020.01) |

(52) U.S. Cl.
CPC .......... *G05D 1/0088* (2013.01); *B60W 30/12* (2013.01); *G05D 1/0231* (2013.01); *G06K 9/00798* (2013.01); *B60W 2552/00* (2020.02)

(58) Field of Classification Search
CPC .............. G05D 1/0088; G05D 1/0231; G06K 9/00798; B60W 30/12
See application file for complete search history.

(56) References Cited

U.S. PATENT DOCUMENTS

| | | |
|---|---|---|
| 8,170,739 B2 | 5/2012 | Lee |
| 8,392,064 B2 | 3/2013 | Thrun et al. |
| 8,706,417 B2 * | 4/2014 | Zeng ...................... G08G 1/167 |
| | | 701/533 |
| 9,187,117 B2 | 11/2015 | Spero et al. |

(Continued)

OTHER PUBLICATIONS

Chen, B-C et al., "Path-Following Steering Controller of Automated Lane Change System with Adaptive Preview Time," published 2015, IEEE International Conference on Systems, Man, and Cybernetics, pp. 2522-2526.

(Continued)

*Primary Examiner* — Alan D Hutchinson
*Assistant Examiner* — Andy Schneider
(74) *Attorney, Agent, or Firm* — Frank MacKenzie; Brooks Kushman, P.C.

(57) ABSTRACT

The disclosure relates to a method for capturing a traffic lane. A traffic lane data set is evaluated to capture an abrupt change of the traffic lane. The traffic lane data set is divided into a new traffic lane data set that represents a new traffic lane boundary and an old traffic lane data set that represents an old traffic lane boundary. A difference data set is determined between the old traffic lane data set and the new traffic lane data set. The difference data set is added to the new traffic lane data set to form a resulting data set, wherein the difference data set is weighted with a plurality of weighting factors.

11 Claims, 7 Drawing Sheets

(56) References Cited

U.S. PATENT DOCUMENTS

2008/0291276 A1* 11/2008 Randler .................. B62D 1/28
  348/149
2012/0197496 A1    8/2012 Limpibunterng et al.
2014/0200768 A1    7/2014 Tsuruta et al.
2015/0353082 A1* 12/2015 Lee ....................... B60W 30/10
  701/41
2016/0327948 A1* 11/2016 Taguchi ............... G05D 1/0077
2016/0375901 A1   12/2016 Di Cairano et al.

OTHER PUBLICATIONS

DE Exam Report dated Sep. 9, 2017 for DE 10 2017 216 063.2, 5 pages.

* cited by examiner

METHOD FOR TRAFFIC LANE RECOGNITION

CROSS-REFERENCE TO RELATED APPLICATIONS

This application claims foreign priority benefits under 35 U.S.C. § 119(a)-(d) to DE Application 10 2017 216 063.2 filed Sep. 12, 2017, which is hereby incorporated by reference in its entirety.

TECHNICAL FIELD

The disclosure relates to a method and device for traffic lane recognition.

BACKGROUND

Traffic lane recognition refers to automated identification of a vehicle's traffic lane and neighboring lanes of road vehicles. On the basis of features of surroundings such as traffic lane markings, information is obtained that is further processed in driver assistance systems or systems of autonomous vehicles. In traffic lane recognition, an image of the surroundings is obtained through sensors, from which an attempt is made using an algorithm (often with image processing means) to calculate the vehicle's traffic lane and, if relevant, the neighboring lanes as well.

Objects, such as for example traffic lane boundaries, which may include side lines, are employed to determine a traffic lane. However, a change from one object to another object, such as a change from a left-hand side line to a right-hand side line, can occur in operation. This can lead to an unwanted, abrupt steering lock to adjust a lane if a change from a left-hand side line to a right-hand side line has an abrupt character.

SUMMARY

It is therefore an object of the disclosure to prevent unwanted, abrupt steering locks to adjust a lane.

According to the disclosure, in a method for capturing a traffic lane with the steps of:

evaluating a traffic lane data set to capture an abrupt change of the traffic lane, dividing the traffic lane data set into a new traffic lane data set that represents a new traffic lane boundary, and an old traffic lane data set that represents an old traffic lane boundary, determining a difference data set between the old traffic lane data set and the new traffic lane data set, and adding the difference data set to the new traffic lane data set to form a resulting data set, wherein the difference data set is weighted with a plurality of weighting factors.

The traffic lane data set comprises, for example, a plurality of data that describe a traffic lane in a travel direction. For example, data can be assigned points arranged equidistantly along a travel route, and at various points, can describe the travel route from a point-of-view of a travel route course. Data for each of the points can, for example, comprise information about a lateral offset, an angle value, a curvature and a curvature rate of the traffic lane.

An abrupt change in the traffic lane is deduced if the traffic lane changes within a predetermined distance in the travel direction with a magnitude that is greater than a predetermined limit value.

In response to a captured abrupt change, the traffic lane data set is divided into a new traffic lane data set that represents a new traffic lane boundary, and an old traffic lane data set that represents an old traffic lane boundary, and a difference data set between the old traffic lane data set and the new traffic lane data set is formed.

Before the difference data set is added to the new traffic lane data set to form a resulting data set, the difference data set is weighted with a plurality of weighting factors in order, in this way, to ensure a soft, in particular a jerk-free, transition from the old traffic lane data set to the new traffic lane data set. In this way, an occurrence of an unwanted, abrupt steering lock for adjusting the lane is avoided.

According to one form of embodiment, values of the weighting factors fall in the travel direction of the traffic lane. A particularly soft transition without jerks is achieved in this way.

According to a further form of embodiment, the values of the weighting factors fall linearly. The values of the weighting factors can thus be determined particularly easily.

According to a further form of embodiment, the traffic lane data set in a region of the abrupt change is divided into the new traffic lane data set and the old traffic lane data set. This ensures that only relevant data are further processed, which leads to a method that makes particularly low demands on computing resources.

A computer program product for carrying out such a method, a device of this sort, such as, but not limited to, for example, a control device, controller, or microprocessor, and a motor vehicle with such a device also belong to the disclosure Further features, properties and advantages of the disclosure result from the following description of exemplary embodiments with reference to the appended figures.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
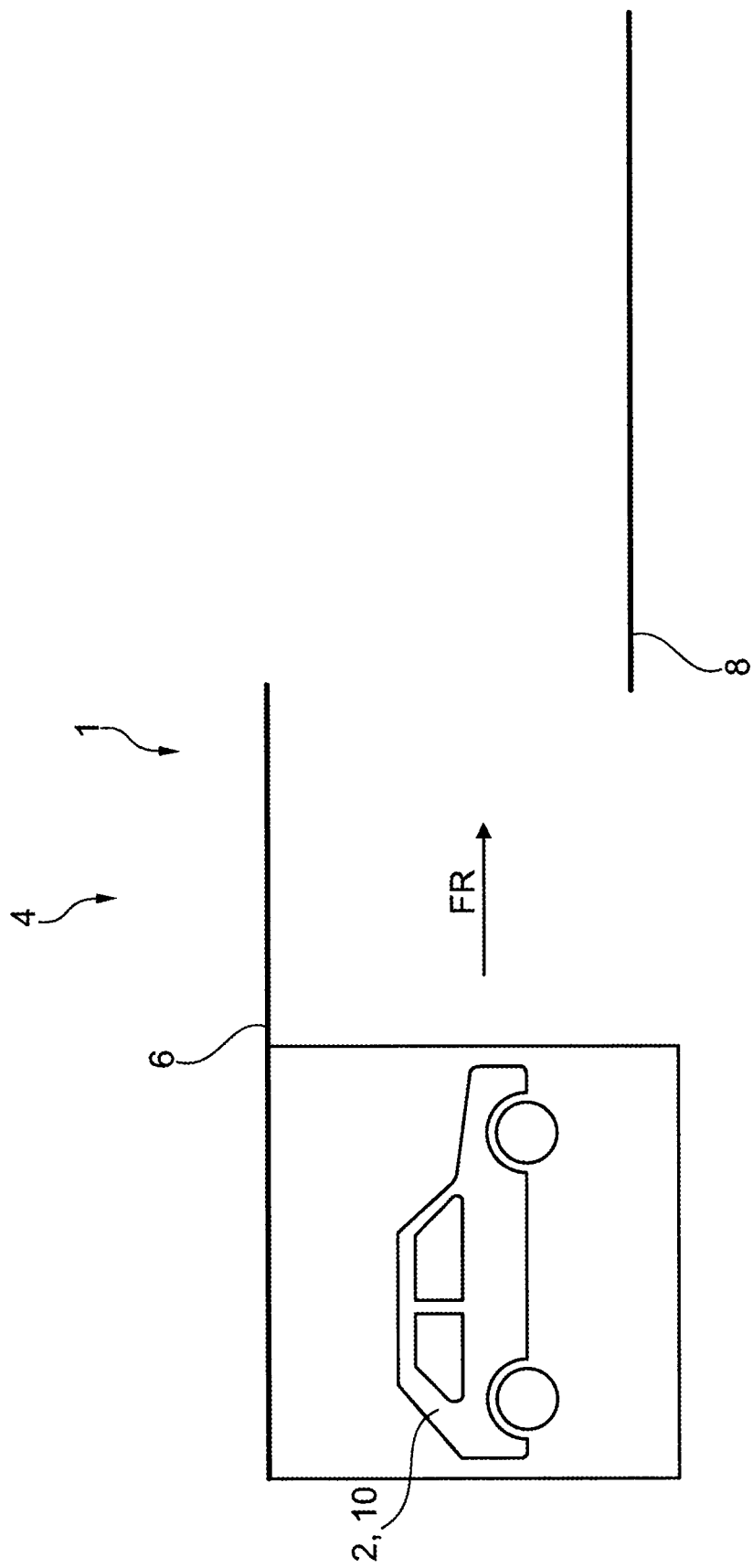
FIG. 1 shows a scenario underlying the disclosure.

Reference is first made to FIG. 1.

A scenario 1 is illustrated in which a motor vehicle 2, a passenger car in the present exemplary embodiment, is moving forward along a traffic lane 4 in a travel direction FR.

The motor vehicle 2 comprises, in the present exemplary embodiment, a driver assistance system (Advanced Driver Assistance System, ADAS). Driver assistance systems here refer to additional electronic equipment in motor vehicles to support the driver in particular driving situations.

In the present exemplary embodiment, the driver assistance system is a lane keeping assistant (also known as a lane assistant, or active lane keeping assistant with steering support), which continuously assists the driver to remain in the lane.

A device 10 for capturing the traffic lane 4 is assigned to the lane keeping assistant. The device 10 captures objects, such as for example traffic lane boundaries 6, 8, to determine the traffic lane 4. In the present exemplary embodiment, a first of the traffic lane boundaries 6 is a left-hand side line in the travel direction FR, and a second of the traffic lane boundaries 8 is a right-hand side line in the travel direction FR.

The left-hand traffic lane boundary 6 ends at a particular position, while the right-hand traffic lane boundary 8 begins at the particular position. A change from a left-hand side line to a right-hand side line thus occurs in operation of the device 10. This can lead to an unwanted, abrupt steering lock that adjusts the lane, since change from the first traffic lane boundary 6 to the second traffic lane boundary 8 has an abrupt character with a change I.

Figure 2:
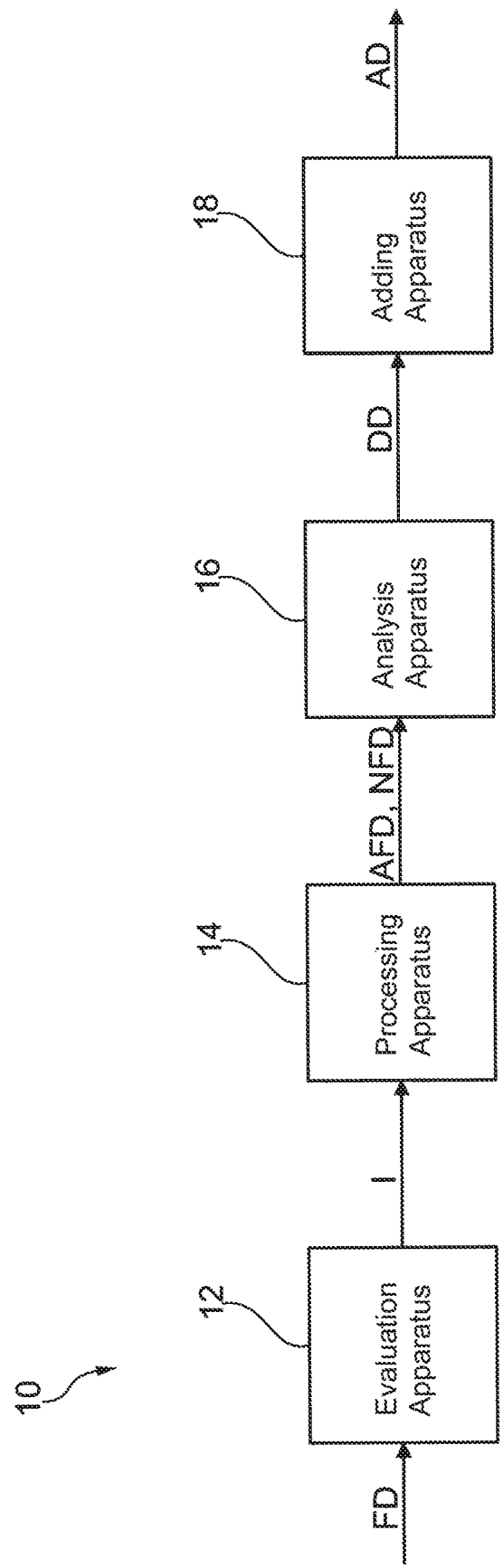
FIG. 2 shows a schematic illustration of an exemplary embodiment of a device that captures a traffic lane.
Figure 3:
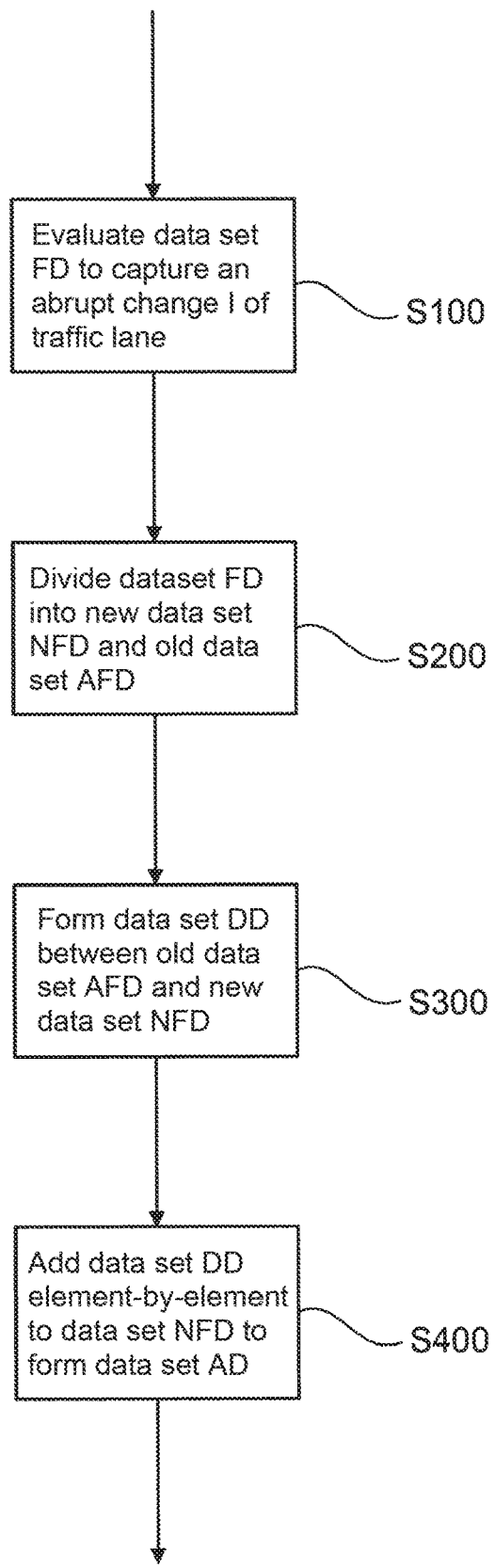
FIG. 3 shows a method flow in operation of the device illustrated in FIG. 2.
Figure 4:
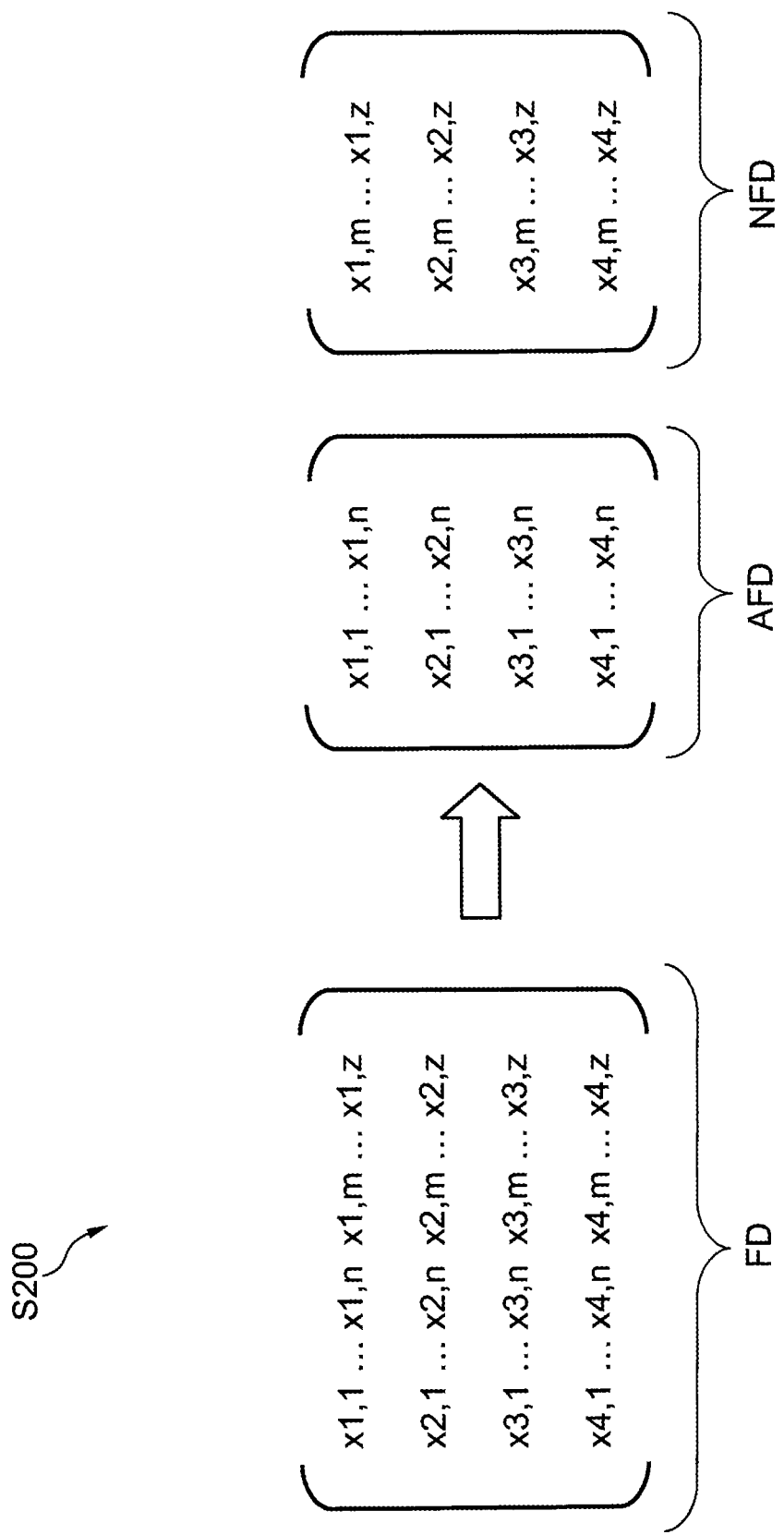
FIG. 4 shows details of the method flow illustrated in FIG. 3.
Figure 5:
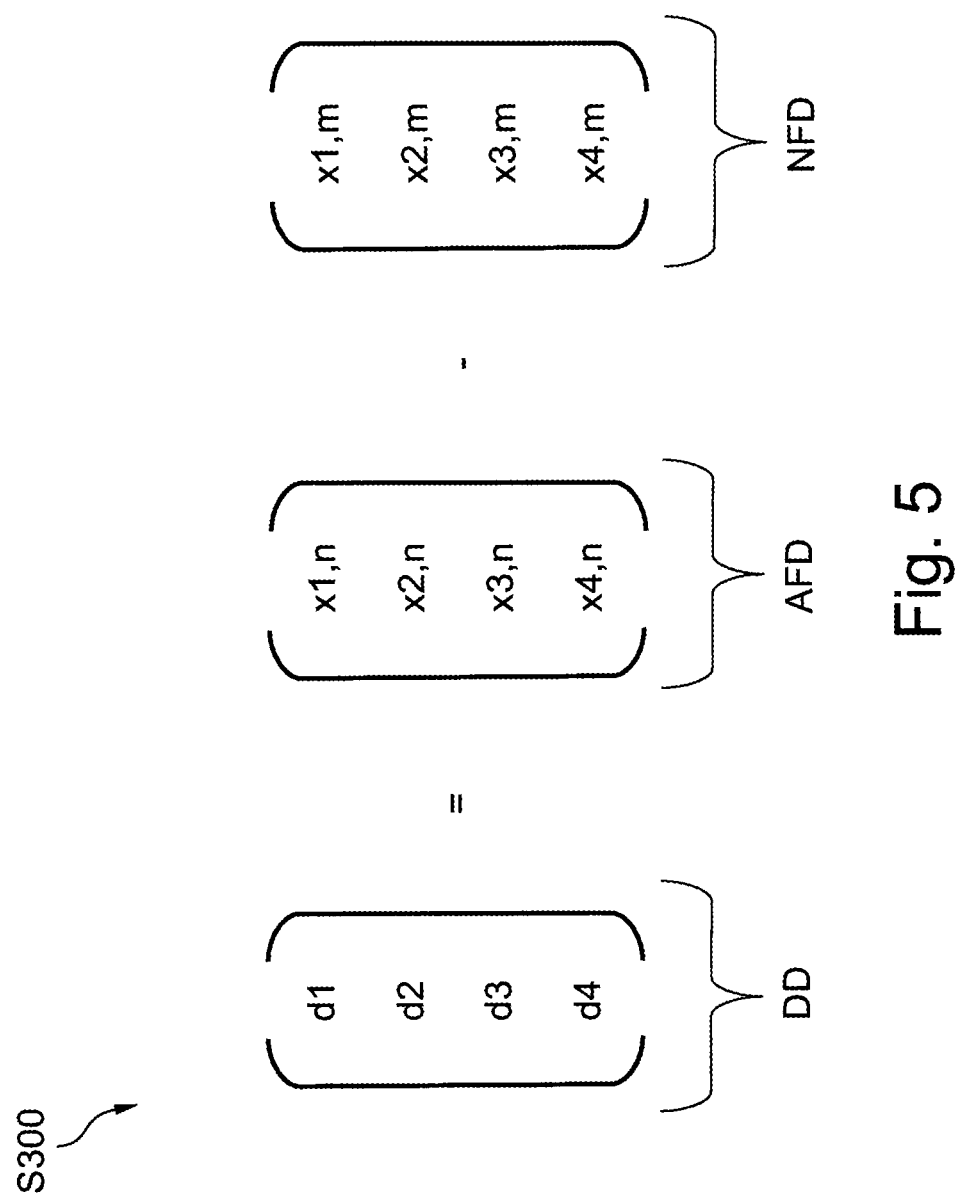
FIG. 5 shows further details of the method flow illustrated in FIG. 3.
Figure 6:
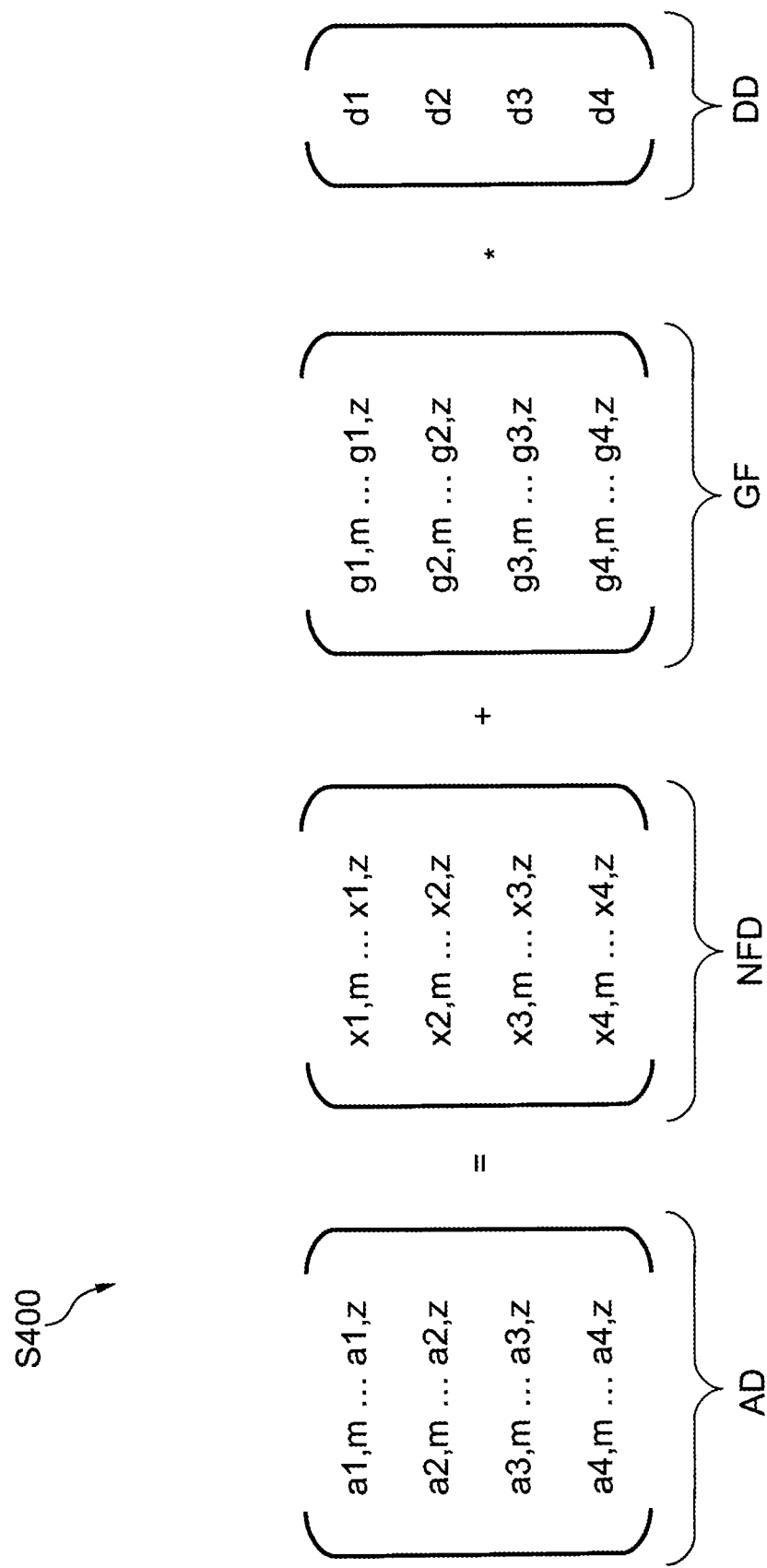
FIG. 6 shows further details of the method flow illustrated in FIG. 3.
Figure 7:
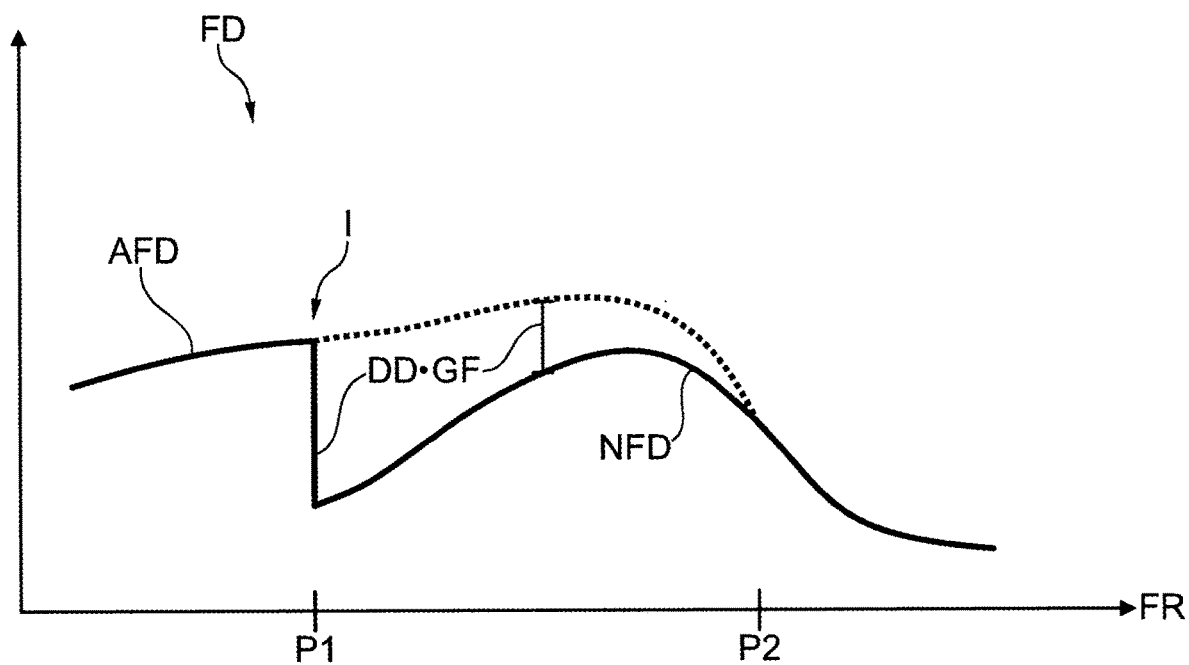
FIG. 7 shows a schematic illustration of data sets that represent traffic lanes.

To prevent unwanted, abrupt steering locks for adjusting the lane, the device 10 according to an exemplary embodiment comprises further components, which are explained with reference to FIG. 2.

The device 10 configured to capture a traffic lane 4 comprises in the present exemplary embodiment an evaluation apparatus 12, a processing apparatus 14, an analysis apparatus 16 and an adding apparatus 18.

The evaluation apparatus 12 is designed for evaluation of a traffic lane data set FD that captures the abrupt change I of the traffic lane 4. For example, the evaluation apparatus 12 is designed to deduce an abrupt change in the traffic lane 4 if the traffic lane 4 changes within a predetermined distance in the travel direction FR with a magnitude that is greater than a predetermined limit value.

The processing apparatus 14 is designed to divide the traffic lane data set FD into a new traffic lane data set NFD that represents the traffic lane boundary 8 and an old traffic lane data set AFD that represents the old traffic lane boundary 6.

The analysis apparatus 16 is designed to determine a difference data set DD between the old traffic lane data set AFD and the new traffic lane data set NFD.

The adding apparatus 18 is designed to add the difference data set DD to the new traffic lane data set NFD to form a resulting data set AD, wherein the difference data set DD is weighted with a plurality of weighting factors GF.

The device 10, the evaluation apparatus 12, the processing apparatus 14, the analysis apparatus 16 and/or the adding apparatus 18 can comprise hardware and/or software components for this purpose, such as for example a controller or microprocessor as understood by a person having ordinary skill in the art.

The operation of the device 10 is now explained with additional reference to FIGS. 3 to 7.

In a first step S100, the traffic lane data set FD is evaluated in order to capture an abrupt change I of the traffic lane 4. An abrupt change in the traffic lane is deduced if the traffic lane changes within a predetermined distance in the travel direction with a magnitude that is greater than a predetermined limit value. It can be seen in FIG. 7 that at position P1 at least one of the values of the traffic lane data set FD exhibits an abrupt change I, which results from a change from the old traffic lane boundary 6 to the new traffic lane boundary 8.

In a further step S200, the traffic lane data set FD is divided into the new traffic lane data set NFD that represents the new traffic lane boundary 8 and the old traffic lane data set AFD that represents the old traffic lane boundary 6 at the position P1 where the abrupt change I is located.

In the present exemplary embodiment, the traffic lane data set FD comprises a plurality of data that describe the traffic lane 4 in the travel direction FR. In the present exemplary embodiment, these are values relating to a lateral offset, an angle value, a curvature and a curvature rate of the traffic lane 4. The values can be assigned equidistant points along the traffic lane 4 in the travel direction FR.

The traffic lane data set FD can, for example, have a format of a matrix, whereby in each column respective values for a lateral offset $x1,1 \ldots x1,n\ x1,m \ldots x1,z$, an angle value $x2,1 \ldots x2,n\ x12m \ldots x2,z$, a curvature $x3,1 \ldots x3,n\ x3,m \ldots x3,z$ and a curvature rate $x4,1 \ldots x4,n\ x4,m \ldots x4,z$ are arranged under one another, and each column of the matrix is respectively assigned to a point along the traffic lane 4 in the travel direction FR.

The new traffic lane data set NFD and the old traffic lane data set AFD on the other hand can, in the present exemplary embodiment, each have the format of a matrix, whereby in respective columns, respective values for a respective lateral offset $x1,1 \ldots x1,n$ in the case of the old traffic lane data set, or $x1,m \ldots x1,z$, in the case of the new traffic lane data set NFD, an angle value $x2,1 \ldots x2,n$ in the case of the old traffic lane data set or $x2,m \ldots x2,z$, in the case of the new traffic lane data set NFD, a curvature $x3,1 \ldots x3,n$ in the case of the old traffic lane data set or $x3,m \ldots x3,z$, in the case of the new traffic lane data set NFD and a curvature rate $x4,1 \ldots x4,n$ in the case of the old traffic lane data set or $x4,m \ldots x4,z$, in the case of the new traffic lane data set NFD are arranged under one another.

In a further step S300, the difference data set DD is formed between the old traffic lane data set AFD and the new traffic lane data set NFD at the position P1.

The last column of the old traffic lane data set AFD $x1,n$, $x2,n$, $x3,n$, $x4,n$ and the first column of the new traffic lane data set NFD $x1,m$, $x2,m$, $x3,m$, $x4,m$ are subtracted from one another element-by-element for this purpose.

In the present exemplary embodiment, the difference data set accordingly has a format of a vector or of a single-column matrix with the elements d1, d2, d3, d4.

In a further step S400, the difference data set DD is added element-by-element to the new traffic lane data set NFD to form a resulting data set AD with the elements $a1,m, \ldots a1,z\ a2,m \ldots a2,z, \ldots a3,m \ldots a3,z, \ldots a4,m \ldots a4,z$. The difference data set DD is weighted element-by-element with a plurality of weighting factors GF, whose values $g1,m$ to $g4,z$ in the travel direction FR of the traffic lane 4 fall linearly in the present exemplary embodiment column-by-column in a direction from $g1,m$ to $g1,z$.

The respective values $g1,m$ to $g4,z$ of the weighting factors GF fall, starting from their maximum value at position P1 down to the value zero at a predetermined position P2, so that on reaching the position P2 a cross-fade process for cross-fading the old traffic lane data set AFD and the new traffic lane data set NFD is complete.

In other words, values g1,m to g4,z can have a format of a matrix, wherein, in each column, respective values are arranged that are assigned to a lateral offset x1,m . . . x1,z, an angle value x2,m . . . x2,z, a curvature x3,m . . . x3,z and a curvature rate x4,m . . . x4,z of the new traffic lane data set NFD, and each column of the matrix is respectively assigned to a point along the traffic lane 4 in the travel direction FR in the region of the new traffic lane boundary 8.

In the present exemplary embodiment, the values of the weighting factors GF fall, for example linearly, in the travel direction FR of the traffic lane 4, i.e. in a matrix, for example column-by-column from left to right.

The resulting data set AD can further have a format of a matrix, wherein, in each column, respective values for a lateral offset a1,m . . . a1,z, an angle value a2,m . . . a2,z, a curvature a3,m . . . a3,z and a curvature rate a4,m . . . a4,z are arranged under one another, and each column of the matrix is respectively assigned to a point along the traffic lane 4 in the travel direction FR in the region of the new traffic lane boundary 8.

The values of the weighting factors GF can be determined by forming a straight compensation line making use of the difference data set DD and a distance between two positions P1 and P2. Varying from a straight compensation line, other functions such as for example sinusoidal functions or polynomial functions can also be used to determine a compensation function.

In this way a soft, in particular jerk-free, transition from the old traffic lane data set AFD to the new traffic lane data set NFD can be ensured. In this way, an occurrence of an unwanted, abrupt steering lock for adjusting the lane is avoided. Changes to the traffic lane 4 that occur during the transition from the old traffic lane data set AFD to the new traffic lane data set NFD are fully taken into account, since the difference data set DD is added to the new traffic lane data set NFD. This makes it possible to follow, or move into the new traffic lane 4, even in the presence of dynamic changes to the new traffic lane data set NFD, and nevertheless not to have an abrupt steering lock when changing the traffic lane data set.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for capturing a traffic lane to avoid steering lock responsive to a change in traffic lane markings, comprising:
    evaluating a traffic lane data set to capture a change of the traffic lane;
    dividing the traffic lane data set into a new traffic lane data set that represents a new traffic lane boundary and an old traffic lane data set that represents an old traffic lane boundary;
    determining a difference data set between the old traffic lane data set and the new traffic lane data set;
    adding the difference data set to the new traffic lane data set to form a resulting data set, wherein the difference data set is weighted with a plurality of weighting factors; and
    adjusting vehicle steering to the resulting data set as opposed to the new traffic lane boundary.

2. The method as claimed in claim 1, wherein values of the weighting factors fall in a travel direction of the traffic lane.

3. The method as claimed in claim 2, wherein the values of the weighting factors fall linearly.

4. The method as claimed in claim 1, wherein the traffic lane data set is divided in a region of the change into the new traffic lane data set and the old traffic lane data set.

5. A device to capture a traffic lane to avoid steering lock responsive to a change in traffic lane markings, comprising:
    an evaluation apparatus configured to evaluate a traffic lane data set that captures a change of the traffic lane;
    a processing apparatus configured to divide the traffic lane data set into a new traffic lane data set that represents a new traffic lane boundary and an old traffic lane data set that represents an old traffic lane boundary;
    an analysis apparatus configured to determine a difference data set between the old traffic lane data set and the new traffic lane data set; and
    an adding apparatus configured to add the difference data set to the new traffic lane data set to form a resulting data set, wherein the difference data set is weighted with a plurality of weighting factors, and the device is further configured to adjust a vehicle steering to the resulting data set as opposed to the new traffic lane boundary.

6. The device as claimed in claim 5, wherein values of the weighting factors fall in a travel direction of the traffic lane.

7. The device as claimed in claim 6, wherein the values of the weighting factors fall linearly.

8. The device as claimed in claim 5, wherein the processing apparatus is designed to divide the traffic lane data set in a region of the change into the new traffic lane data set and the old traffic lane data set.

9. A vehicle comprising:
    a device configured to,
        responsive to a change of a lane captured via a camera, divide the lane into a new lane that represents a new lane boundary and an old lane that represents an old lane boundary,
        responsive to a difference between the old lane and the new lane, add the difference to the new lane to generate a resulting data set, and
        adjust a vehicle steering to the resulting data set as opposed to the new lane boundary, wherein the difference is weighted with weighting factors.

10. The vehicle as claimed in claim 9, wherein values of the weighting factors fall in a travel direction of the lane.

11. The vehicle as claimed in claim 10, wherein the values of the weighting factors fall linearly.

* * * * *